US008693167B2

(12) United States Patent
Yano et al.

(10) Patent No.: US 8,693,167 B2
(45) Date of Patent: Apr. 8, 2014

(54) ELECTRONIC COMPONENT AND LEAD-WIRE FOR THE SAME

(75) Inventors: Yasuhiro Yano, Yamaguchi (JP); Douyuu Hachisu, Yamaguchi (JP); Junji Yamane, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 13/387,151

(22) PCT Filed: Aug. 23, 2011

(86) PCT No.: PCT/JP2011/004660
§ 371 (c)(1),
(2), (4) Date: Jan. 26, 2012

(87) PCT Pub. No.: WO2012/032720
PCT Pub. Date: Mar. 15, 2012

(65) Prior Publication Data
US 2012/0267161 A1  Oct. 25, 2012

(30) Foreign Application Priority Data

Sep. 10, 2010 (JP) .................. 2010-202590

(51) Int. Cl.
*H01G 9/10* (2006.01)
(52) U.S. Cl.
USPC .......... 361/520; 361/538; 361/540; 174/94 R; 174/528
(58) Field of Classification Search
USPC ........ 174/520, 521, 527, 528, 94 R; 361/502, 361/503, 540, 517–520, 523, 535–538, 361/306.1
See application file for complete search history.

(56) References Cited

U.S. PATENT DOCUMENTS

| 5,453,295 | A | * | 9/1995 | Sammel et al. | 427/195 |
| 5,580,358 | A | * | 12/1996 | Narusawa et al. | 29/25.03 |
| 6,058,006 | A | * | 5/2000 | Yoshioka et al. | 361/511 |
| 6,366,447 | B1 | | 4/2002 | Nakaaki | |
| 8,130,486 | B2 | * | 3/2012 | Kawahara et al. | 361/511 |
| 8,163,997 | B2 | * | 4/2012 | Harazono et al. | 174/94 R |
| 2009/0323254 | A1 | | 12/2009 | Yamane et al. | |

FOREIGN PATENT DOCUMENTS

| CN | 101512692 | 8/2009 |
| JP | 04-225207 | 8/1992 |
| JP | 11-162796 | 6/1999 |
| JP | 2001-210551 | 8/2001 |

(Continued)

OTHER PUBLICATIONS

Japanese version of International Search Report of PCT/JP2011/004660, dated Oct. 4, 2011.

*Primary Examiner* — Angel R Estrada
*Assistant Examiner* — Dimary Lopez
(74) *Attorney, Agent, or Firm* — Panasonic Patent Center

(57) ABSTRACT

An electronic component includes a lead wire, a functional element, and an outer housing. The lead wire includes a leader electrode made of metal containing aluminum, a metal wire containing tin, and a welded section formed by welding a first end of the metal wire to a first end of the leader electrode. A second end of the leader electrode is connected to the functional element. The outer housing seals the functional element therein such that a second end of the metal wire is led out therefrom. The lead wire further includes a resin film coating the welded section at least at a portion not covered with the outer housing. Resin material for the resin film has pierce strength of 0.05 MPa/μm per unit thickness or greater and an elastic coefficient of 10 GPa or less.

12 Claims, 4 Drawing Sheets

(56) References Cited

FOREIGN PATENT DOCUMENTS

| JP | 2007-067146 | 3/2007 |
| JP | 2008-091846 | 4/2008 |
| JP | 2008-235322 | 10/2008 |
| JP | 3151177 | 6/2009 |
| JP | 2009-272462 | 11/2009 |
| WO | 2011/045971 | 4/2011 |

* cited by examiner

ELECTRONIC COMPONENT AND LEAD-WIRE FOR THE SAME

This application is a U.S. national phase application of PCT international application PCT/JP2011/004660, filed Aug. 23, 2011 which claims the benefit of JP application No. 2010-202590, filed Sep. 10, 2010.

TECHNICAL FIELD

The present invention relates to electronic components and lead-wires to be used in the same electronic components. More particularly, it relates to a capacitor including an insulating sealing member having through-holes through which lead wires pass.

BACKGROUND ART

In recent years, the concept of environmental protection has prevailed, and this concept encourages electronic devices to use lead-free components. As a result, many of electronic components undergo the change in specifications in order to eliminate lead from the materials.

On the other hand, the lead can advantageously suppress the growth of acicular whisker of metal, e.g. tin. In a conventional electronic component, in particular, the lead prevents lead-wires extending outside the electronic component from generating whisker. The lead-wire free from lead and extending outsides the components thus tends to generate whisker. On top of that, the whisker flows out of the electronic component due to vibration or shock, the whisker drops on a circuit board of an electronic device and incurs a short-circuit, so that the electronic device possibly encounters a failure. To overcome this problem, various measures are taken to prevent the generation, growth, and flow-out of the whisker.

FIG. 4 is a sectional view of an aluminum-electrolytic capacitor of surface mounting type. This capacitor is taken as an example of a conventional electronic component. This capacitor includes capacitor element 6 working as a functional element, lead-wires 1, outer case 7A, sealing member 7C, and insulating terminal board 8. Lead-wire 1 is led out from capacitor element 6. Cylindrical outer case 7A with a bottom accommodates capacitor element 6. Sealing member 7C is provided with through-holes 7D through each which lead-wire 1 passes. Sealing member 7C is disposed at an opening of case 7A, and is compressed by drawn-processed section 7B which is formed by drawing an outer wall of case 7A. Sealing member 7C thus seals the opening of outer case 7A. Insulating terminal board 8 is disposed on the opening of case 7A, and has through-holes 8A through each which lead-wire 1 led out from sealing member 7C passes. Terminal board 8 also is provided with grooves 8B formed on the outer wall of board 8, and each groove 8B accommodates lead-wire 1 bent at approx. right angles after passing through hole 8A.

Lead-wire 1 is formed of leader electrode 2 made of aluminum wire, metal wire 3, resin film 5. Metal wire 3 is a CP wire plated with tin, and first end 3A thereof is welded to first end 2A of leader electrode 2. Second end 2B of leader electrode 2 is connected to capacitor element 6, and second end 2B of metal wire 3 is connected to a circuit pattern (not shown) on circuit board 9 with solder 9A.

Resin film 5 covers welded section 4 between first end 2A of leader electrode 2 and first end 3A of metal wire 3. Thermosetting resin adhesive, e.g. epoxy resin, is employed as the material for resin film 5.

After the welding of leader electrode 2 to metal wire 3 and before welded section 4 is covered with resin film 5, lead wire 1 in process is washed by alkaline cleaning fluid, and then the alkaline cleaning fluid is removed. On top of that, lead-wire 1 is heated for approx. 21 minutes at 150° C. after or before the washing and the removal of the cleaning fluid.

The wash of welded section 4 with the alkaline cleaning fluid allows solving and removing tin attached onto the surface of welded section 4, so that the wash can prevent the generation of tin-whisker. The heat treatment at 150° C. allows easing the stress accumulated in grain boundary of aluminum, thereby preventing the tin in the grain boundary from forming acicular whisker or preventing the whisker from growing. Additionally, the form of resin film 5 prevents moisture, which causes the generation of whisker, from entering from the outside. As a result, the generation of the tin whisker can be prevented. Even if the whisker is generated, resin film 5 can block the outflow of whisker to the outside. The structure discussed above allows preventing tin acicular whisker from occurring at welded section 4 where aluminum is mixed with tin. (This is disclosed in, e.g. Patent Literature 1.)

Removal of tin from the surface of welded section 4 actually delays the generation of whisker some degree; however, a long-term environmental load test reveals the tin survived the washing and remained in depth direction of welded section 4, thereby still generating the whisker.

Although welded section 4 of lead wire 1 is coated with resin film 5, some material of film 5 cannot sufficiently prevent the generation of whisker. In this case, the whisker protrudes from welded section 4, and if vibrations or shocks are applied, the whisker flows outside the electronic component. As a result, the electronic device employing the foregoing conventional electronic component might encounter a short circuit or a malfunction caused by the acicular whisker dropped onto circuit board 9.

CITATION LIST

Patent Literature

Patent Literature 1; Unexamined Japanese Patent Publication No. 2007-67146

SUMMARY OF INVENTION

The present invention provides a highly reliable electronic component that can prevent generation of whisker from a lead wire having a welded section where aluminum and tin exist together, and it also relates to a lead wire employed in the electronic component.

The electronic component of the present invention includes a lead wire, a functional element, and an outer housing. The lead wire is formed of a leader electrode made of metal containing aluminum, a metal wire containing tin, and a welded section formed by welding a first end of the metal wire to a first end of the leader electrode. A second end of the leader electrode is connected to the functional element. The outer housing seals the functional element therein with a second end of the metal wire being led to the outside. The lead wire includes a resin film coating the welded section at least at a portion not covered with the outer housing. The material of this resin film has a pierce strength of not lower than 0.05 MPa/μm per unit thickness and an elastic coefficient of not greater than 10 GPa.

The foregoing structure prevents acicular whisker from breaking through the resin film although the whisker tries to grow at and extend from the welding section formed between the leader electrode and the metal wire. Even if mechanical stress is applied to the lead wire, no crack is generated in the resin film. The electronic component of the present invention thus can steadily prevent the whisker from flowing to the outside. As a result, the electronic device mounted with the electronic component of the present invention can be free from a failure, e.g. a short circuit or a malfunction, caused by the whisker.

DETAILED DESCRIPTION OF PREFERRED EMBODIMENTS

Figure 1:
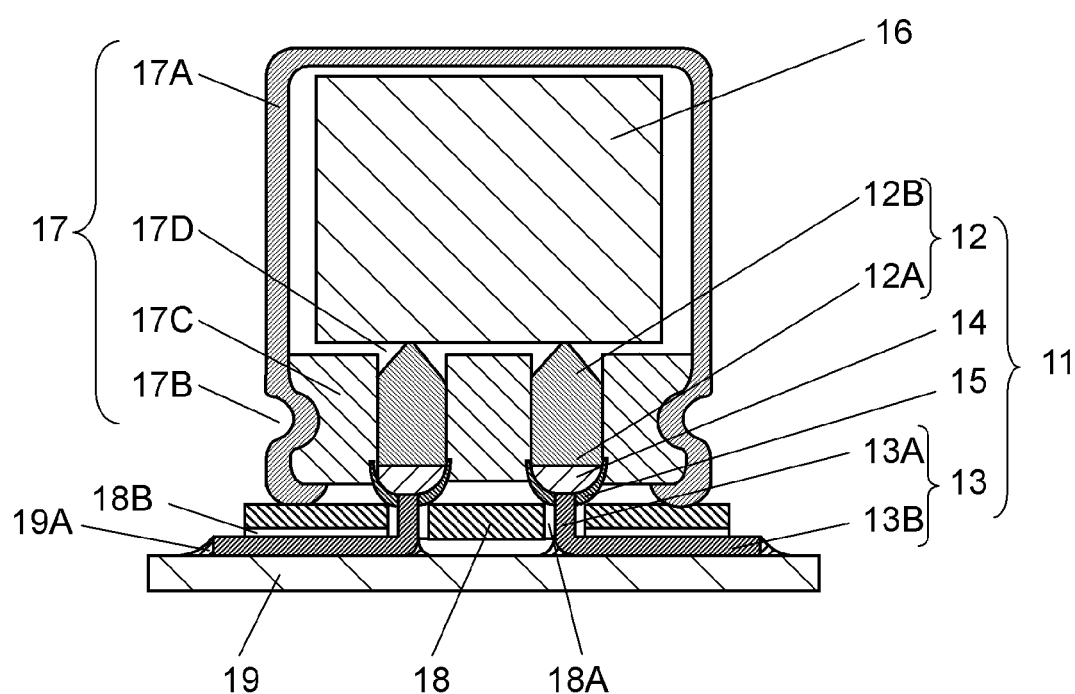
FIG. 1 is a sectional view illustrating a structure of an aluminum electrolytic capacitor as an example of an electronic component in accordance with an embodiment of the present invention.
Figure 2:
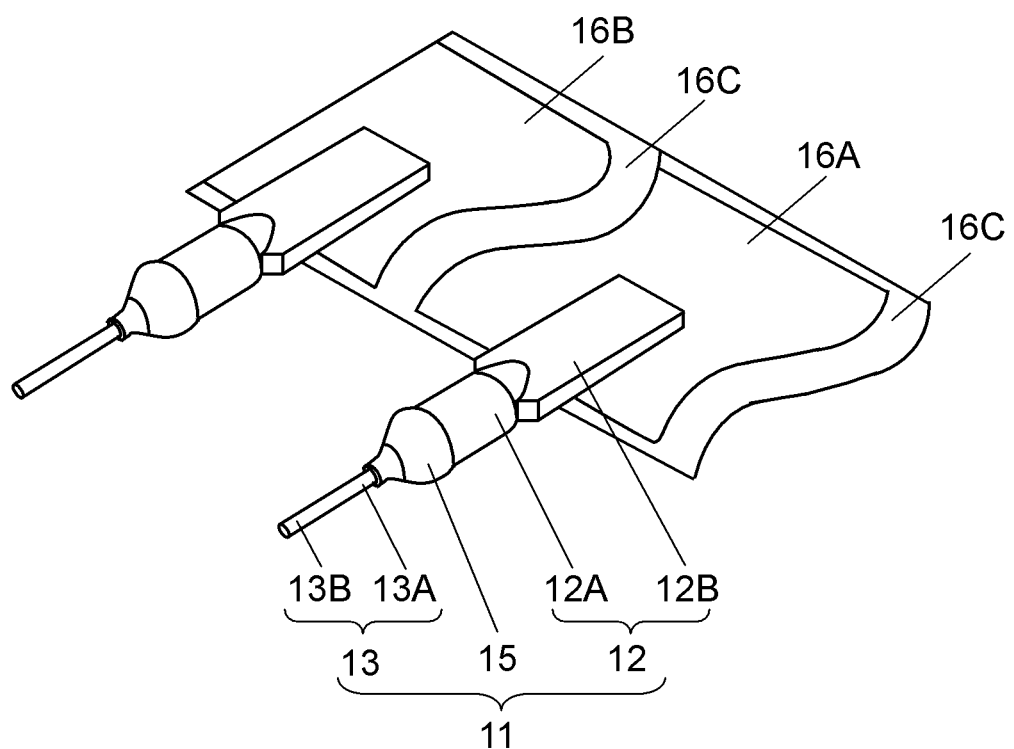
FIG. 2 is an exploded perspective view of a capacitor element of the aluminum electrolytic capacitor shown in FIG. 1.

FIG. 1 is a sectional view illustrating a structure of an aluminum electrolytic capacitor of surface mounting type as an example of an electronic component in accordance with the embodiment of the present invention. FIG. 2 is an exploded perspective view of a capacitor element of this aluminum electrolytic capacitor.

As shown in FIG. 1, this aluminum electrolytic capacitor includes capacitor element 16 working as a functional element, a pair of lead wires 11, and outer housing 17. These elements form a main body in a form of radial lead type. Each of lead wires 11 is connected to capacitor element 16 at a first end. Outer housing 17 seals therein capacitor element 16 together with electrolyte (not shown) taking the form of liquid such that a second end of lead wire 11 is led to the outside.

Outer housing 17 is formed of outer case 17A and sealing member 17C. Outer case 17A is shaped like a cylinder and has a bottom for accommodating capacitor element 16 impregnated with the electrolyte solution. Sealing member 17C is provided with a pair of through-holes 17D for the pair of lead wires 11 to pass through. Sealing member 17C is disposed at an opening of outer case 17A, and an outer wall of case 17A undergoes a drawing process so that drawn section 17B is formed, and sealing member 17C is thus compressed, whereby the opening of case 17A is sealed. Sealing member 17C is made of rubber material, e.g. EPT (ethylene-propylene terpolymer) IIR (copolymer of isobutyl and isoprene), or resin material such as epoxy resin.

Use of insulating terminal board 18 allows changing the electronic component of radial lead type to a surface mounting type. Board 18 is disposed on the opening of outer case 17A and has a pair of through-holes 18A, through which metal wires 13 of the pair of lead wires 11 led out from sealing member 17C can pass. Meanwhile, a pair of grooves 18B are formed on the outer surface of insulating board 18, and grooves 18B accommodate metal wires 13 extending from through-holes 18A and bent along approx. right angle direction.

As shown in FIG. 2, capacitor element 16 working as a functional element is formed by winding anode foil 16A and cathode foil 16B together with separator 16C interposed therebetween. Anode foil 16A is made by roughing a foil made of valve metal such as aluminum by etching process and then forming a dielectric oxide film (not shown) thereon by chemical conversion. Cathode foil 16B is made of valve metal such as aluminum. Separator 16C is made of non-woven fabric containing cellulose, kraft, polyethylene terephthalate, nylon, rayon, or glass.

Each of flat sections of second ends 12B of leader electrodes 12 is connected to anode foil 16A and cathode foil 16B respectively by a crimping method, ultrasonic welding method, or pressure welding method. As shown in FIG. 1, first ends 12A of leader electrode 12 are led out from the same end face of capacitor element 16.

The electrolyte solution to be impregnated into capacitor element 16 is prepared by dissolving solute in solvent. In general, organic solvent, e.g. ethylene glycol, γ-butyrolactone, sulfolane, is used for this solvent, and salt containing acid component, e.g. adipic acid, maleate acid, and basic component, e.g. ammonia, is used as the solute. The electrolyte solution can contain some additive, when necessary, for absorbing gas, stabilizing a withstand voltage, adjusting pH, and anti-oxidization.

As the electrolyte, solid electrolyte or combination of solid and liquid electrolytes can be also employed. The solid electrolyte preferably employs conductive polymer, e.g. polythiophene or its derivatives. The solid electrolyte layer (not shown) made of the conductive polymer, e.g. polythiophene or its derivative, is formed between anode foil 16A and cathode foil 16B of capacitor element 16.

Capacitor element 16 can be formed by layering multiple electrode foils instead of winding the electrode foils. The word of functional element refers to active elements and passive elements coordinating electric function. For instance, in the case of capacitor, the functional element is the capacitor element, and in the case of battery, the functional element is a battery element, and in the case of semiconductor, the functional element is a semiconductor element. In other words, this embodiment refers to a capacitor as an example; however, the present invention is not limited to the capacitor.

Next, a structure of lead wire 11 is demonstrated hereinafter. Lead wire 11 includes leader electrode 12 made of metal containing aluminum, metal wire 13, and resin film 15. First end 13A of metal wire 13 plated with tin is welded to first end 12A of leader electrode 12. In other words, metal wire 13 contains tin, and lead wire 11 includes welded section 14 that is formed by welding first end 13A of metal wire 13 to first end 12A of leader electrode 12. Resin film 15 coats welded section 14 at least at a portion not covered with sealing member 17C of outer housing 17.

Leader electrode 12 employs, in general, aluminum wire of round bar type for the aluminum electrolytic capacitor. As shown in FIG. 2, second end 12B of leader electrode 12 is formed into a flat shape, and connected to capacitor element 16.

Metal wire 13 passes through hole 17D of sealing member 17C and is led out to the outside, where metal wire 13 works as an external terminal. When this aluminum electrolytic capacitor is surface-mounted to circuit board 19, second end 13B of metal wire 13 is pressed or bent. To be more specific, second end 13B is electrically connected to a circuit pattern (not shown) on circuit board 19 with solder 19A.

Metal wire 13 used in the aluminum electrolytic capacitor generally employs a wire called as "CP wire". The CP wire contains steel or copper wire as core material from the view point of mechanical strength, conductivity, and solderability.

The CP wire is coated with copper, and a metal layer of excellent solderability, e.g. tin is formed thereon.

Welded section 14 between leader electrode 12 and metal wire 13 forms a metal layer where the metal material of leader electrode 12 and that of metal wire 13 are melted and mixed together. The melted portion of welded section 14 is cooled and solidified, and an appearance of this portion can be visible through magnifying glass. A mixed status of metal elements in depth direction of welded section 14 can be checked with a focused ion beam device (FIB) or an X-ray micro analyzer (XMA).

When metal wire 13 made of steel wire plated with tin is welded to leader electrode 12 made of metal containing aluminum, a metal layer, in which aluminum and tin are mixed, is formed in welded section 14. This structure tends to generate acicular whisker from the surface of welded section 14 when external factor, e.g. water attaches thereto, influences welded section 14. An edge portion of welded section 14 at the metal wire 13 side in the welded section 14 is a boundary between metal wire 13 plated with tin and welded section 14, so that the tin exists at this edge portion comparatively in a greater amount than other portions of welded section 14. The whisker tends to appear in this edge portion among others.

Resin film 15 is formed so as to coat the surface of welded section 14; however, it can coat at least an exposed portion of welded section 14 in view of preventing the outflow of the whisker generated at welded section 14. The structure shown in FIG. 1 illustrates that lead wire 11 passes through hole 17D of sealing member 17C, and second ends 13B of metal wires 13 are led out to the outside. In this case, if resin film 15 is not used, a portion of welded section 14 not covered with sealing member 17C is exposed when lead wires 11 are led out of sealing member 17C. Even if through-hole 17D of sealing member 17C is narrowed as thin as possible, sealing member 17C cannot cover completely the edge portion of welded section 14 at the metal wire 13 side. As a result, resin film 15 needs to coat at least the edge portion of welded section 14 at the side nearer metal wire 13.

The resin material of film 15 needs to be strong enough against the stretching load generated by the growth of acicular whisker. The strength of the resin material is scaled, in general, by using the strength of pencil lead. However, the strength important for blocking the outflow of acicular whisker to the outside is a pierce strength. The resin material having the pierce strength of 0.05 MPa/$\mu$m per unit thickness or greater is selected for resin film 15. The whisker having the pierce strength less than 0.05 MPa/$\mu$m will break film 15 and protrudes, so that vibrations or shocks will cause the outflow of the whisker to the outside.

Since it is difficult to measure the pierce strength of resin film 15 coating welded section 14 of lead wire 11, a sample of the resin film is made separately for measuring the pierce strength. This sample is formed by applying the resin solution with a certain thickness on a glass substrate, and hardening and drying the solution under the disposition condition of the resin solution for forming the film, and then removing the film from the glass substrate.

The pierce strength is measured in the following way: First, the thickness of a target portion to be pierced with a needle, of the sample is measured in advance and then the sample is fixed. In the atmosphere of ambient temperature and humidity, the sample is pierced with a needle made by SUS at a speed of 50±0.5 mm/minute. The needle has a diameter of 1.0 mm and flat tip. The maximum load until the needle penetrates the sample is measured. The maximum load is divided by a sectional area of the needle so as to calculate the pierce strength, which is then divided by the measured thickness so as to calculate a pierce strength per unit thickness.

The shape of lead wire 11 is processed in order to mount the capacitor to circuit board 19, so that mechanical stress is applied to welded section 14 of lead wire 11. Metal wire 13 working as an external terminal, in particular, is pressed or bent, so that the edge portion of welded section 14 at the metal wire 13 side is susceptible to the mechanical stress. When the resin material of film 15 lacks flexibility, namely, when the resin material has a high elastic coefficient, the mechanical stress generated in the shaping process and applied to lead wire 11, will cause cracks on film 15, or film 15 will peel off welded section 14. As a result, although resin film 15 satisfies well enough the pierce strength, gaps can be generated and the gaps work as a path allowing the whisker to flow out. To overcome this problem, resin material having an elastic coefficient of 10 GPa or less is used for withstanding the mechanical stress applied to lead wire 11 during the shaping process of lead wire 11. This elastic coefficient refers to a bending modulus.

The shaping process of lead wire 11 in the case of surface-mounting type aluminum electrolytic capacitor is to provide metal wire 13 of lead wire 11 with a pressing process or bending process when insulating terminal board 18 is mounted to outer housing 17. In the case of radial-lead type aluminum electrolytic capacitor, metal wire 13 of lead wire 11 sometimes undergoes the bending process depending on a type of mounting.

In addition to the pierce strength and elastic coefficient, adhesion of the resin material to a base member, such as welded section 14, aluminum, or tin, is also an important physical property of the resin material for preventing the generation and outflow of the whisker. Even if the resin material for resin film 15 satisfies the necessary pierce strength and the elastic coefficient, when the adhesion becomes weaker with time, resin film 15 may peel off welded section 14 and a path for the whisker to flow to the outside may be formed. In addition, the peel-off of resin film 15 tends to incur water-immersion, which induces the generation of whisker on the surface of welded section 14. Therefore, it is preferable to select the resin material based on the adhesion besides the foregoing pierce strength and the elastic coefficient. The condition of adhesion is determined this way: a resin material undergoes a pressure cooker test (PCT) which is a typical load test for evaluating degradation in adhesion of resin material. After this test, the resin material should maintain adhesion not less than 10N. If the adhesion is less than 10N, resin film 15 will peel off welded section 14 due to the lack of adhesion when a cubical expansion coefficient of the resin material changes due to, e.g. heat cycle load. As a result, a path can be formed for the whisker to flow to the outside.

It is difficult to measure the adhesion of resin film 15 coating welded section 14 of lead wire 11, so that a sample of the resin film is formed separately for the measurement. The sample is made this way: First, resin solution by 0.1 ml is dropped on an aluminum plate and a tin plate, and then a brass pin having a diameter of 5 mm is placed on the resin solution. Then a film is formed under the deposition condition of the resin solution by hardening and drying the foregoing resin solution. Next, the foregoing plates are fixed, and then the respective films are stretched with a tension tester (a push-pull gauge) in the environment of the ambient temperature and humidity. Then the strength necessary for the resin film to peel off the aluminum plate and the tin plate is measured respectively.

The electronic component is used also in an on-vehicle electric device. Particularly in recent years, electronic control units (ECU) for the on-vehicle electric device are often disposed in the engine room, so that the electronic components used in the ECU are demanded to have thermal resistance such as withstanding the maximum operating temperature 150° C. It is necessary that lead wire 11 of high-class electronic components guaranteed against such a high temperature includes resin film 15 of which resin material needs to maintain its physical properties stably when resin film 15 is subjected to the environment of as high as 150° C. When the temperature exceeds the glass transition point, the resin material, among others, softens and its pierce strength lowers, which makes the resin material unstable. The resin material thus preferably has a glass transition point over 150° C. To be more specific, when the maximum operating temperature of the electronic component is 150° C., the resin material having the glass transition point over 150° C. is selected. The glass transition temperature of the resin material can be measured, in general, with a dynamic viscoelastometer or TMA.

In a case where the electronic components are used in the on-vehicle electric device, the components need to withstand changes in temperature of external environment, i.e. heat cycle load. When the electronic components are subjected to the heat cycle load and if the resin material has a great difference in Young's modulus between a high temperature side and a low temperature side, the adhesion of the resin film 15 lowers. In order to maintain the adhesion of resin film 15 necessary for preventing the whisker from projecting or flowing out, it is preferable that Young's modulus at 150° C. falls within a range of 10-100% of that at −55° C.

A favorable resin material satisfying the foregoing conditions necessary for anti-whisker, i.e. pierce strength, elastic coefficient, adhesion, glass transition temperature, and Young's modulus at −55° C. and 150° C., is polyester imide or aromatic polyamide-imide. In other words, it is preferable that the resin material be chiefly made of polyester imide or aromatic polyamide-imide. Resin film 15 can contain either one of these resins at a ratio necessary for determining its physical properties predominantly, namely, it can contain curing agent remaining or filler. The content of either one of these resins is preferably not less than 50%.

To increase the adhesion of resin film 15 to welded section 14, a primary layer made of adhesion assisting agent, e.g. coupling agent, coats welded section 14 first, and then resin film 15 can be formed thereon, or resin film 15 containing the adhesion assisting agent can be used.

The polyamide-imide includes aliphatic polyamide-imide besides aromatic polyamide-imide; however, it is preferable to use aromatic polyamide-imide because it has the pierce strength enough for anti-whisker so that it can form highly strong resin film.

In the case of using the electronic components in an on-vehicle electric device, the components are subjected to the environment within the vehicle, so that oil can be supposed to attach to the surface of the components in the worst case. The electronic component, including electrolyte solution accommodated in its housing together with a functional element, sometimes exposes resin film 15 coating welded section 14 of lead wire 11 to the electrolyte solution chiefly made of organic solvent. Considering such a case, resin film 15 needs to have strong solvent resistance. To synthesize the resin material of aromatic polyamide-imide, an isocyanate method and acid-chloride method are well known. The aromatic polyamide-imide synthesized by the isocyanate method is excellent in solvent resistance, and on top of that, it can maintain the pierce strength, elastic coefficient, and adhesion necessary for anti-whisker even in the environment susceptible to the influence from the solvent. Use of the aromatic polyamide-imide synthesized by the isocyanate method is thus preferable.

Resin film 15 needs to be formed in the area including the edge portion of welded section 14 at the side nearer metal wire 13 and an edge portion at a side nearer leader electrode 12 in order to coat the entire welded section 14. In this case, resin film 15 can be formed on parts of the surface of leader electrode 12; however, in the case of the aluminum electrolytic capacitor, outer housing 17 is formed of outer case 17A and sealing member 17C, and lead wire 11 passes through hole 17D of sealing member 17C when lead wire 11 is led out to the outside. If the film thickness of resin film 15 is thicker than 5% of the diameter of leader electrode 12 of the electronic component having the foregoing structure, it is difficult for leader electrode 12 to pass through hole 17D. As a result, failures in the assembly process increase. Excessive thickness of resin film 15 will form a greater level difference between a coated portion and a bare portion, so that leader electrode 12 cannot adhere to sealing member 17C at this level different portion, thereby generating some gap therebetween. As a result, the adhesion lowers at the interface between through-hole 17D of sealing member 17C and leader electrode 12, and the airtight performance degrades. The maximum thickness of resin film 15 should be determined within a range avoiding the foregoing problems.

The thickness of resin film 15 over 1000 μm tends to build stress therein, so that resin film 15 could peel off welded section 14 during the shaping process, e.g. bending, provided to lead wire 11.

To the contrary, excessively thin resin film 15 will spoil the stability thereof and film 15 cannot maintain the pierce strength important for anti-whisker. The minimum thickness of film 15 is 10 μm.

As discussed above, in the case of aluminum electrolytic capacitor, the thickness less than 10 μm of resin film 15 makes it difficult to maintain the pierce strength enough for anti-whisker purpose, and the thickness thereof over 5% of diameter of leader electrode 12 will make it difficult for lead wire 11 to pass through hole 17D of sealing member 17C, so that the failures in the assembly process increase or the airtight reliability degrades. As a result, the film thickness of resin film 15 preferably falls within the range from not smaller than 10 μm to not greater than 5% of the diameter of leader electrode 12.

A correlation exists between the pierce strength of resin film 15 and a molecular weight of the resin material, i.e. the pierce strength per unit thickness becomes stronger at a greater molecular weight, so that the greater molecular weight needs a thinner thickness of film 15 for maintaining the necessary pierce strength.

Use of aromatic polyamide-imide having a weight average molecular weight not smaller than 30,000 as the resin material allows forming resin film 15 having the pierce strength and elastic coefficient necessary for anti-whisker purpose. In a case of using aromatic polyamide-imide having an excessive molecular weight, a viscosity of the resin solution made by dissolving the resin material into solvent becomes so high that it is difficult to apply the resin solution to a target surface. In such a case, a ratio of the solvent should be increased for lowering the viscosity. When the weight average molecular weight of aromatic polyamide-imide exceeds 150,000, a density of the resin material in the resin solution should be substantially reduced in order to lower the viscosity. As a result, it is difficult to obtain a film thickness of 10 μm necessary for anti-whisker with a one time application process, and multiple applications are needed to obtain the thickness of not smaller than 10 μm, so that workability is lowered extremely.

As discussed above, the use of aromatic polyamide-imide having the weight average molecular weight ranging from not smaller than 30,000 to not greater 150,000 is preferable to form resin film 15. Use of the resin material falling within the above range allows forming resin film 15, which satisfies the conditions necessary for anti-whisker, by one time application process of the resin solution.

Next, a method for manufacturing lead wire 11 is demonstrated hereinafter. First, first end 12A of leader electrode 12 and first end 13A of metal wire 13 are welded together. The welding method may be one of various methods, e.g. arc welding, resistance welding, laser welding. First end 12A of leader electrode 12 is butted against first end 13A of metal wire 13, and then the butted portion is heated to melt by one of the foregoing welding methods before cooling and solidifying the butted portion, thereby forming welded section 14. Leader electrode 12 and metal wire 13 are thus unified together.

It is preferable that a recess be formed on first end 12A of leader electrode 12, and first end 13A of metal wire 13 is fitted into this recess before the welding. To be more specific, it is preferable to heat the leader electrode externally with a gas burner or a laser beam, thereby forming a metal diffusion layer on the interface where first end 13A fits into first end 12A. This structure allows reducing greatly an area exposed from the outer surface of welded section 14, so that the generation of whisker can be reduced. However, some portion of welded section 14 is still exposed at the root of metal wire 13, so that the foregoing structure cannot completely prevent the generation of whisker.

Then second end 12B of leader electrode 12 undergoes a pressing process to finely shape its outline and form a flat portion. Lead wire 11 is cleaned with cleaning fluid to remove dust and the like attached to the surface thereof. Use of alkaline cleaning agent will dissolve the surface of welded section 14 of lead wire 11 so that tin existing on the surface layer of welded section 14 can be removed. As a result, the generation of whisker can be delayed.

A heat treatment around 150° C. can be done before or after the foregoing washing process, whereby the stress built in the grain boundary of aluminum can be eased, and the generation of tin whisker can be thus delayed.

Lead wire 11 can undergo chemical conversion to form an oxide film of aluminum on the surface thereof for improving the quality by, e.g. reducing a leakage current, preventing leakage of solution when electrolyte solution is used, and reducing a change in capacitance, of the electronic component.

Next, resin film 15 is formed on welded section 14. As a method for forming resin film 15, it is suitable for forming a thin, uniform and highly adhesive resin film 15 to apply the resin solution to welded section 14. The resin solution is applied by using a brush and the like. It is preferable to apply the resin solution discharged from a dispenser or a spray onto welded section 14 with lead wire 11 revolving. This method allows increasing the productivity and coating all over the target welded section 14 with uniform resin film 15 efficiently. Then the resin solution is dried and hardened in accordance with the deposit condition of the resin solution before forming resin film 15.

Adhesion assisting agent, e.g. coupling agent, can be applied to welded section 14 before the application of the resin material for forming resin film 15 in order to improve the adhesion of film 15 to welded section 14. The resin material can be also mixed with the adhesion assisting agent, e.g. coupling agent. The resin material can contain coloring agent, e.g. pigment, dye, carbon black, for coloring resin film 15 so that the inspection can be done easily to check whether film 15 is formed well or not.

It is desirable to form resin film 15 in an area including the edge portion of welded section 14 at the metal wire 13 side and the edge portion thereof at the leader electrode 12 side for coating the entire welded section 14.

Figure 3:
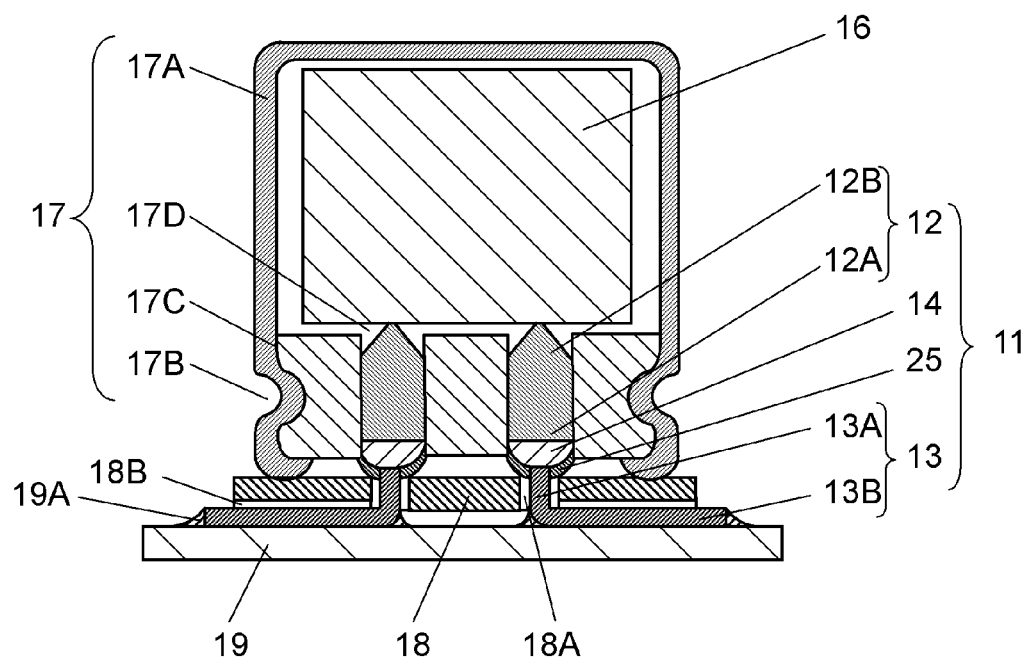
FIG. 3 is a sectional view illustrating another structure of the aluminum electrolytic capacitor of surface mounting type as an example of an electronic component in accordance with an embodiment of the present invention.
Figure 4:
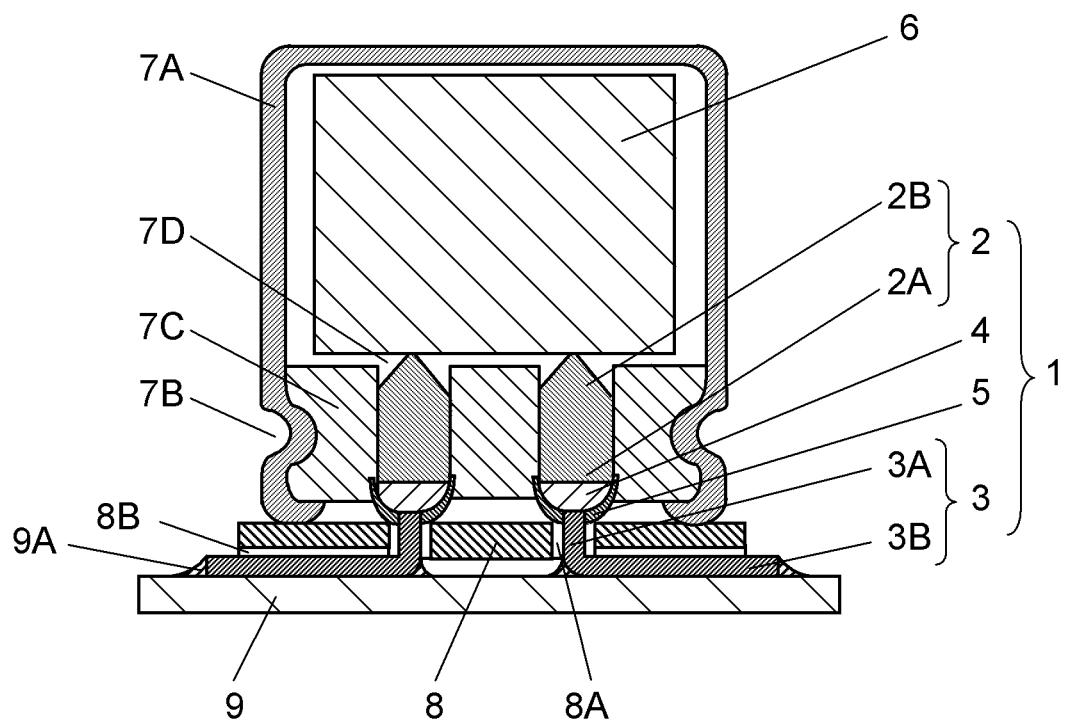
FIG. 4 is a sectional view illustrating a structure of a conventional aluminum electrolytic capacitor of surface mounting type.

However, resin film 25 can be formed as shown in FIG. 3, which is a sectional view showing another structure of a surface mounting type aluminum electrolytic capacitor in accordance with the embodiment. Although resin film 25 is not formed to cover the entire welded section 14, it covers, with reliability, a portion of welded section 14 stuck out from sealing member 17C after lead wire 11 passes through hole 17D of sealing member 17C. This structure provides an advantage similar to that of resin film 15 previously discussed.

A method for manufacturing the surface-mounting type aluminum electrolytic capacitor as an example of the electronic component in accordance with the embodiment 1, is demonstrated hereinafter with reference to FIG. 1 and FIG. 2 by employing lead wire 11 manufactured as discussed above.

First, as shown in FIG. 2, anode foil 16A, cathode foil 16B, and separator 16C are cut at predetermined width and length. Anode foil 16A is made of valve metal, e.g. aluminum, having a dielectric layer of oxide film on the surfaces. Second ends 12B of leader electrodes 12 are crimped to anode foil 16A and to cathode foil 16B respectively, and connected to them together by an ultrasonic method, and then separator 16C is interposed between anode foil 16A and cathode foil 16B then, they are wound together to form a cylindrical shape. The cylindrical shape is maintained with an insulating tape (not shown) fastened around the outer periphery face thereof. Capacitor element 16 is thus formed.

The surface of anode foil 16A is subjected with etching or deposition of metal particles so that the surface area is expanded appropriately. The dielectric layer made of oxide film is formed by anodic oxidation of the valve metal, e.g. aluminum, employed as material for the electrode, whereby a dielectric oxide film is formed. Other than this method, the oxide film can be formed by depositing or applying the dielectric layer to the electrode material. The surface of cathode foil 16B can undergo, upon necessity, the surface treatment such as etching, coating with oxide film, depositing metal particles, attaching conductive particles, e.g. carbon.

Next, each one of the pair of lead wires 11 led out from capacitor element 16 is inserted into respective one of through-holes 17D provided in sealing member 17C so that capacitor element 16 is mounted to sealing member 17C. Then, capacitor element 16 is accommodated in outer case 17A together with the electrolyte solution, and sealing member 17C is disposed on the opening of case 17A.

A predetermined amount of the electrolyte solution is put in outer case 17A in advance, and capacitor element 16 can be impregnated with this solution after the accommodation into case 17A. Besides, capacitor element 16 can be dipped into a bath storing the electrolyte solution, then taken out from the bath, and then accommodated into outer case 17A. If necessary, atmospheric decompression can be done around outer case 17A.

A solid electrolyte can be formed instead of impregnating capacitor element 16 with the electrolyte solution. In this case, firstly capacitor element 16 is dipped into chemical conversion solution, and then a voltage is applied across a pair of lead wires 11, thereby repairing and forming the oxide film on the surface of anode foil 16A. Next, a solid electrolyte layer is formed between anode foil 16A and cathode foil 16B of capacitor element 16. For instance, when poly 3,4 ethylene dioxy thiophene (PEDOT) is used as the conductive polymer, capacitor element 16 is impregnated with fluid dispersion of PEDOT, and taken out therefrom, and then dried for forming the solid electrolyte. Instead of the foregoing method, capacitor element 16 can be impregnated with the monomer solution of 3,4 ethylene dioxy thiophene and oxidizer solution containing ferric p-toluene sulfonate one by one for causing a chemical polymerization reaction in capacitor element 16, whereby PEDOT can be formed. Besides, these solutions are mixed together, and capacitor element 16 is impregnated with this mixed solution for forming PEDOT.

Next, a circular groove is formed on and around the outer wall of outer case 17A to form drawn portion 17B so that the opening of outer case 17A is sealed.

Resin film 15 can be formed on welded section 14 after the opening of outer case 17A is sealed with sealing member 17C instead of forming resin film 15 on welded section 14 when forming lead wire 11. In this case, the resin solution is applied so as to cover welded section 14 exposed externally from through-hole 17D, and then the solution is dried and hardened following the deposition condition for forming resin film 15.

After the foregoing processes, second ends 13B of metal wires 13 of a pair of lead wires 11 led out from the outer face of sealing member 17C are press, thereby shaping second ends 13B into flat. Then, lead wires 11 are inserted into a pair of through-holes 18A provided on insulating terminal board 18, and board 18 is placed on the opening of outer case 17A. Next, each one of second ends 13B of a pair of metal wires 13 is bent at approx. right angles toward opposite directions to each other, whereby second ends 13B can be accommodated in grooves 18B formed on the outer surface of insulating board 18. The surface mounting type aluminum electrolytic capacitor is thus completed.

It is preferable to apply a voltage across the pair of lead wires 11 for implementing the chemical conversion again, any time after sealing the opening of outer case 17A, after the shaping process of lead wire 11, or after mounting insulating terminal board 18.

As discussed previously, resin film 15, which coats welded section 14 formed between leader electrode 12 and metal wire 13 of lead wire 11, has the strength not to be broken by the acicular whisker growing, and yet, resin film 15 has an elastic coefficient that allows film 15 to be kept free from cracks even if mechanical stress generated during the shaping process of lead wire 11 is applied to resin film 15. Lead wire 11 thus can prevent the acicular whisker from extending through welded section 14.

The electronic component employing the foregoing lead wire 11 is free from acicular whisker projecting from welded section 14, so that the outflow of the whisker due to vibrations or shocks can be prevented steadily. As a result, the electronic device employing the foregoing electronic components can prevent failures, e.g. short circuit or malfunction, caused by the whisker.

In addition to satisfying the conditions such as the pierce strength and elastic coefficient, it is preferable for resin film 15 to maintain the adhesion not lower than 10N after the pressure cooker test. This condition allows resin film 15 coating lead wire 11 to maintain the adhesion even if the coefficient of cubical expansion of the resin material is changed by heat-cycle load. As a result, the electronic component employing lead wire 11 can prevent the outflow of whisker more steadily.

The resin material of resin film 15 has a glass transition point at 150° C. or higher, so that even if lead wire 11 is subjected to the environment of external temperature 150° C., the resin material cannot be softened so that the pierce strength is prevented from lowering. As a result, the acicular whisker can be prevented from projecting from welded section 14, and the electronic component employing lead wire 11 can prevent the outflow of the whisker more steadily.

It is preferable that resin film 15 should employ the resin material having Young's modulus at 150° C. falling within a range from 10% to 100%, inclusive, of that at −55° C. Even if resin film 15 is subjected to a severe external environment, e.g. the temperature varies from −55° C. to 150° C., the difference in thermal expansion coefficients is preferably small between the high temperature and the low temperature. The smaller difference in thermal expansion coefficients allows resin film 15 of lead wire 11 to maintain the adhesion and to be free from peel-off. As a result, the electronic component employing lead wire 11 can prevent the outflow of whisker more steadily.

Polyamide-imide is sometimes used as a resin material for housing or coating of general electronic components. For the countermeasure against whisker, however, special conditions for anti-whisker should be considered, e.g. pierce strength, elastic coefficient, adhesion, glass transition temperature, Young's modulus at 150° C. and −55° C. Taking these conditions into account, it is preferable to select aromatic polyamide-imide from various kinds of polyamide-imide. Use of the aromatic polyamide-imide as the resin material allows forming highly strong resin film 15, so that even thin resin film 15 can efficiently suppress the generation of whisker and prevent the outflow of whisker from lead wire 11. As a result, the electronic component employing lead wire 11 can prevent the outflow of the whisker to the outside still more steadily. Since the thickness of film 15 can be thinner, the process time of applying, drying and hardening resin film 15 can be shortened. The productivity of the electronic component can be thus improved.

Among some kinds of aromatic polyamide-imide, it is preferable to use the aromatic polyamide-imide synthesized by an isocyanate method for the resin material. If the resin film is subjected to solvent, use of the aromatic polyamide-imide allows lead wire 11 to maintain the pierce strength, elastic coefficient, and adhesion necessary for anti-whisker. The electronic component employing lead wire 11 thus can prevent the outflow of the whisker to the outside yet more steadily.

It is preferable that the weight average molecular weight of the aromatic polyamide-imide to be used as the resin material falls within the range from 30,000 to 150,000, inclusive. This condition allows one time application of the resin solution to provide resin film 15 with necessary conditions for anti-whisker. The electronic component employing lead wire 11 thus can prevent the outflow of the whisker to the outside steadily, and the process time for applying, drying, and hardening resin film 15 can be shortened, thereby improving the productivity.

The advantages of lead wire 11 are demonstrated hereinafter with reference to the following specific exemplary samples 1-6.

Sample 1

As exemplary sample 1 of electronic component of the present embodiment, a surface-mounting type aluminum electrolytic capacitor is assembled. The specification of this capacitor is followings: rated voltage: 35V, electrostatic capacity: 1000, diameter: 8 mm, height: 10.2 mm, and guaranteed service life: 3000 hours at 125° C.

In the first place, lead wire 11 is prepare following the procedure below: leader electrode 12 employing aluminum wire having 99.9% purity and 1.5 mm diameter, and metal wire 13 employing steel wire coated with copper and plated with tin and having 0.6 mm diameter are used. First, first end 12A of leader electrode 12 is butted to first end 13A of metal wire 13, and the butted portion is heated to melt by an arc welding method. Then, the butted portion is cooled and solidified to form welded section 14, thereby unifying leader electrode 12 and metal wire 13 together.

Next, second end 12B of leader electrode 12 is pressed and shaped into a flat section. Then, lead wire 11 is washed with alkaline cleaning fluid, and dried, and then lead wire 11 is dipped into chemical conversion fluid for forming an oxide film of aluminum on the surface in order to improve the quality by, e.g. reducing leakage current, preventing leakage solution of electrolyte solution, and reducing changes in capacitance of the aluminum electrolytic capacitor.

Thereafter, the resin solution discharged from a dispenser is applied onto the entire welded section 14 while lead wire 11 is rotated. The resin solution employs aromatic polyamide-imide as resin material having weight average molecular weight of 90,000, made by the isocyanate method, and N-methyl pyrolidone as solvent.

After the application of the resin solution, the solvent is volatized to form resin film 15. The process of applying the resin solution and volatizing the solvent is done only one time for forming resin film 15 having a film thickness of 30 μm. Lead wire 11 is thus prepared.

Second, the aluminum electrolytic capacitor is assembled following the procedure below:

Anode foil 16A, cathode foil 16B, and separator 16C are cut at predetermined width and length. Anode foil 16A is made of aluminum having a dielectric layer of oxide film on its surface. Second ends 12B of leader electrodes 12 are connected to anode foil 16A and to cathode foil 16B respectively by a needle crimping method, and then separator 16C is interposed between anode foil 16A and cathode foil 16B then, they are wound together to form a cylindrical shape. The cylindrical shape is maintained with an insulating tape fastened around the outer periphery face thereof. Capacitor element 16 is thus formed. The surface of anode foil 16A is subjected with etching so that the surface area is expanded.

The dielectric layer made of aluminum oxide film is formed by anodic oxidation on the surface of anode foil 16A. As separator 16C, non-woven fabric chiefly made of cellulose is employed.

Next, each one of a pair of lead wires 11 led out from capacitor element 16 is inserted into respective one of through-holes 17D provided in sealing member 17C made of rubber packing, thereby mounting sealing member 17C to capacitor element 16.

The electrolyte solution prepared from chief solvent containing γ-butyrolactone and chief solution containing ammonium salt which is a chemical compound of cyclic amidine. This electrolyte solution is poured into cylindrical outer case 17A made of aluminum and having a bottom.

Capacitor element 16 is then inserted into outer case 17A so that element 16 is impregnated with the solution, and sealing member 17C mounted to element 16 is placed on the opening of case 17A. Next, a circular groove is formed on and around the outer wall of outer case 17A to form drawn portion 17B, thereby generating compression stress to sealing member 17C made of elastic rubber, and the opening of outer case 17A is thus sealed.

Then, voltage of 40V for 60 minutes is applied across a pair of lead wires 11 led out to the outside for carrying out the chemical conversion again. A main body of a radial-lead type aluminum electrolytic capacitor is thus completed.

After the foregoing processes, second ends 13B of metal wire 13 of a pair of lead wires 11 led out from the outer face of sealing member 17C are pressed, thereby shaping second ends 13B into flat. Then, lead wires 11 are inserted into a pair of through-holes 18A provided on insulating terminal board 18, respectively, and board 18 is placed on the opening of outer case 17A. Next, each one of second ends 13B of a pair of metal wires 13 are bent at approx. right angles toward opposite directions to each other, whereby second ends 13B are accommodated in grooves 18B formed on the outer surface of insulating board 18. The surface mounting type aluminum electrolytic capacitor is thus completed.

Samples 2-6 and comparison examples 1-4 detailed hereinafter employ different resin materials of resin film 15 coating welded section 14 from that of the foregoing embodiment 1. Table 1 lists the resin materials employed in the aluminum electrolytic capacitors used in (exemplary) samples 1-6 and comparison examples 1-4.

TABLE 1

| | resin material | physical properties P.S. (MPa/μm) | E.C. (GPa) | thickness of resin film (μm) | details of resin material |
|---|---|---|---|---|---|
| example 1 | resin material | OK (0.30) | OK (3.5) | 30 | polyamidimid(aromatic, isocyanate method, weight average molecular weight: 90,000) |
| example 2 | resin material | OK (0.20) | OK (2.5) | 45 | polyamidimid(aromatic, isocyanate method, weight average molecular weight: 30,000) |
| example 3 | resin material | OK (0.35) | OK (4.0) | 20 | polyamidimid(aromatic, isocyanate method, weight average molecular weight: 150,000) |
| example 4 | resin material | OK (0.30) | OK (3.5) | 30 | polyamidimid(aromatic, acid-chloride method, weight average molecular weight: 90,000) |
| example 5 | resin material E | OK (0.38) | OK (4.5) | 16 twice application | polyamidimid(aromatic, isocyanate method, weight average molecular weight: 200,000) |
| example 6 | resin material F | OK (0.16) | OK (3.5) | 40 | polyester imide |
| comparison example 1 | resin material | NG (0.04) | OK (2.0) | 45 | polyamidimid(aromatic, isocyanate method, weight average molecular weight: 25,000) |
| comparison example 2 | resin material | OK (0.25) | NG (12.0) | 75 | epoxy |
| comparison | resin | NG | OK | 75 | fluoroelastomer |

TABLE 1-continued

|  | resin material | physical properties | | thickness of resin film (μm) | details of resin material |
|---|---|---|---|---|---|
|  |  | P.S. (MPa/μm) | E.C. (GPa) | | |
| example 3 | material I | (0.02) | (0.8) | | |
| comparison example 4 | resin material J | NG (0.03) | OK (2.0) | 75 | IIR |

*P.S.: pierce strength, E.C.: elastic coefficient

Sample 2

In sample 2, resin material B shown in Table 1 is employed instead of resin material A used in the sample 1. The weight average molecular weight of resin material B is smaller than that of resin material A. Other properties remain unchanged from those of sample 1, and then a surface mounting type aluminum electrolytic capacitor is prepared. This capacitor has a rated voltage of 35V and electrostatic capacitance of 100 μF.

Sample 3

In sample 3, resin material C shown in Table 1 is employed instead of resin material A used in the sample 1. The weight average molecular weight of resin material C is greater than that of resin material A. Other properties remain unchanged from those of sample 1, and then a surface mounting type aluminum electrolytic capacitor is prepared. This capacitor has a rated voltage of 35V and electrostatic capacitance of 100 μF.

Sample 4

In sample 4, resin material D shown in Table 1 is employed instead of resin material A used in the sample 1. Resin material D is synthesized by a method different from that for resin material A. Other properties remain unchanged from those of sample 1, and then a surface mounting type aluminum electrolytic capacitor is prepared. This capacitor has a rated voltage of 35V and electrostatic capacitance of 100 μF.

Sample 5

In sample 5, resin material E shown in Table 1 is employed instead of resin material A used in the sample 1. The weight average molecular weight of resin material E is greater than those of resin materials A and C. The process of applying and volatizing the resin solution is repeated twice for forming resin film 15. Other properties remain unchanged from those of sample 1, and then a surface mounting type aluminum electrolytic capacitor is prepared. This capacitor has a rated voltage of 35V and electrostatic capacitance of 100 μF.

Sample 6

In sample 6, resin material F shown in Table 1 is employed instead of resin material A used in the sample 1. Resin material F has a structure different from that of resin material A. Other properties remain unchanged from those of sample 1, and then a surface mounting type aluminum electrolytic capacitor is prepared. This capacitor has a rated voltage of 35V and electrostatic capacitance of 100 μF.

Comparison Example 1

Comparison example 1 employs resin material G listed in Table 1 instead of resin material A used in the sample 1. The weight average molecular weight of resin material G is smaller than those of resin materials A and B. Other properties remain unchanged from those of sample 1, and then a surface mounting type aluminum electrolytic capacitor is prepared. This capacitor has a rated voltage of 35V and electrostatic capacitance of 100 μF.

Comparison Example 2

Comparison example 2 employs resin material H listed in Table 1 instead of resin material A used in the sample 1. Resin material H has a structure different from that of resin material A. Other properties remain unchanged from those of sample 1, and then a surface mounting type aluminum electrolytic capacitor is prepared. This capacitor has a rated voltage of 35V and electrostatic capacitance of 100 μF.

Comparison Example 3

Comparison example 3 employs resin material I listed in Table 1 instead of resin material A used in the sample 1. Resin material I has a structure different from that of resin material A. Other properties remain unchanged from those of sample 1, and then a surface mounting type aluminum electrolytic capacitor is prepared. This capacitor has a rated voltage of 35V and electrostatic capacitance of 100 μF.

Comparison Example 4

Comparison example 3 employs resin material J listed in Table 1 instead of resin material A used in the sample 1. Resin material J has a structure different from that of resin material A. Other properties remain unchanged from those of sample 1, and then a surface mounting type aluminum electrolytic capacitor is prepared. This capacitor has a rated voltage of 35V and electrostatic capacitance of 100 μF.

It is difficult to measure the pierce strength directly from resin film 15 coating welded section 14 of lead wire 11, so that a sample of the resin film is prepared separately for measuring the pierce strength. This sample is prepared by the method discussed previously and the pierce strength is measured following the way discussed previously.

In the case of discharging the resin solution from the dispenser while lead wire 11 is rotated for forming resin film 15 on welded section 14, the thickness of resin film 15 is varied depending on the resin materials, so that the thickness of the resin film to be formed by one time application process is checked.

Next, 30 samples of the aluminum electrolytic capacitor respectively for samples 1-6 and comparison examples 1-4 are prepared, and those samples undergo various types of anti-whisker tests. Before and after the various tests, it is checked whether or not an abnormality is found on resin film 15 coating welded section 14 of lead wire 11 at a portion not covered with sealing member 17C of outer housing 17. The criterion for determining an abnormality is a state where acicular whisker pierces resin film 15 and projects by over 40 μm, or a state where a crack or peel-off is found on resin film 15 even no acicular whisker projects therefrom.

First, lead wire 11 undergoes a bending test to find an index to durability of resin film 15 against mechanical stress. Next, lead wire 11 undergoes a high-temperature and humidity proof test and a heat cycle test. These tests are environmental load tests generally implemented as accelerated tests for evaluating the generation and growth of whisker.

The bending test on lead wire 11 is done in the following way: metal wire 13 is bent one time at 90 degree while leader electrode 12 is fixed. The high temperature and humidity proof test is done in the following way: the aluminum electrolytic capacitor is subjected to the condition of 60° C. and 95% RH for 4000 hours. The heat cycle test is done in the following way: the aluminum electrolytic capacitor is left in the condition from −40° C. to 85° C. and the temperature is varied in 1500 cycles (one cycle takes 30 minutes for each temperature). The results after those tests are listed in Table 2.

of acicular whisker is found on resin film 15 coating welded section 14. Those resin materials also have elastic coefficients not greater than 10 GPa bearable against the mechanical stress applied to lead wire 11 during its shaping process. An application of the mechanical stress to lead wire 11 thus does not generate cracks or peel-off on resin film 15.

Next, a test focusing on the adhesion of the resin material of resin film 15 is done. The adhesion is tested by a pressure cooker test method which allows accelerated evaluation. In this test, the sample of resin film is subjected to the conditions of 121° C., a pressure of 2 atmosphere, and 100% RH for 24 hours. The sample is prepared and the tests are done following the methods discussed previously. The test result is shown in Table 3.

TABLE 2

|  | resin material | test | | |
| --- | --- | --- | --- | --- |
|  |  | lead-wire bending | H.T.P proof test | heat-cycle test |
| example 1 | resin material | No abnormality | No abnormality | No abnormality |
| example 2 | resin material | No abnormality | No abnormality | No abnormality |
| example 3 | resin material | No abnormality | No abnormality | No abnormality |
| example 4 | resin material | No abnormality | No abnormality | No abnormality |
| example 5 | resin material | No abnormality | No abnormality | No abnormality |
| example 6 | resin material | No abnormality | No abnormality | No abnormality |
| comparison example 1 | resin material G | No abnormality | Abnormality *2 | No abnormality |
| comparison example 2 | resin material H | Abnormality *1 | No abnormality | Abnormality *3 |
| comparison example 3 | resin material I | No abnormality | Abnormality *2 | No abnormality |
| comparison example 4 | resin material J | No abnormality | Abnormality *2 | Abnormality *3 |

H.T.P.: High-Temperature and Humidity
*1 crack generated on resin film
*2 whisker projected greater than 40 μm
*3 peeling of resin film generated As Table 2 indicates, comparison examples 1, 3, and 4 employ resin materials G, I, and J, respectively, and the high temperature and humidity proof test, which is the environmental load easy to generate and develop the acicular whisker, reveals the projections of the whisker on those resin materials. The whisker projections can be determined as abnormality, and they are caused by the shortage of pierce strength of those resin materials as Table 1 shows.

Comparison example 2 uses resin material H, and abnormal cracks are found on resin film 15 through the bending test on lead wire 11. These cracks are caused by a higher elastic coefficient as shown in Table 1. The heat cycle test also reveals peel-off of resin film 15. This peel-off is caused by a greater change in Young's modulus of resin material H between −55° C. and 150° C.

On the other hand, lead wires 11 used in samples 1-6 employ resin materials A-F of which pierce strength is 0.05 MPa/μm or greater that is bearable against the force of whisker growing in acicular shape. Although the environmental load easy to generate and develop the acicular whisker is applied to lead wire 11, no abnormal projections over 40 μm

TABLE 3

|  | resin material | Adhesion(N) | |
| --- | --- | --- | --- |
|  |  | aluminum | tin substrate |
| example 1 | resin material A | OK(30.3) | OK(30.3) |
| example 2 | resin material B | OK(18.5) | OK(15.2) |
| example 3 | resin material C | OK(35.6) | OK(32.5) |
| example 4 | resin material D | OK(31.0) | OK(30.2) |
| example 5 | resin material E | OK(37.0) | OK(33.0) |
| example 6 | resin material F | OK(25.7) | OK(24.1) |
| comparison example 1 | resin material G | OK(17.5) | OK(12.5) |
| comparison example 2 | resin material H | OK(31.8) | OK(16.2) |
| comparison example 3 | resin material I | OK(17.3) | OK(32.9) |
| comparison example 4 | resin material J | NG(0.3) | NG(0.1) |

As indicated in Table 3, resin material J employed in the aluminum electrolytic capacitor of comparison example 4 does not maintain the adhesion of not smaller than 10 N after the pressure cooker test.

On the other hand, lead wires 11 used in samples 1-6 employ resin materials A-F of which adhesions to the aluminum plate and the tin plate are maintained at 10N or greater after the pressure cooker test. Even if the coefficient of cubical expansion of the resin material is changed by heat-cycle load, resin film 15 does not peel off welded section 14 and keeps adhering thereto. As a result, the outflow of whisker to the outside can be prevented steadily.

Table 4 shows the glass transition temperatures and Young's modulus at 150° C. and −55° C. of resin materials A-J employed in samples 1-6 and comparison examples 1-4.

TABLE 4

| | | physical properties | | | |
|---|---|---|---|---|---|
| | | glass transition temperature (° C.) | Young's modulus A(GPa) 150° C. | Young's modulus B(GPa) −55° C. | (Young's modulus A/Young's modulus B) * 100 (%) |
| example 1 | resin material A | 260 | 3.6 | 4.1 | 87.8 OK |
| example 2 | resin material B | 250 | 3.4 | 3.9 | 87.2 OK |
| example 3 | resin material C | 270 | 3.7 | 4.2 | 88.1 OK |
| example 4 | resin material D | 210 | 3.5 | 4 | 87.5 OK |
| example 5 | resin material E | 280 | 3.8 | 4.3 | 88.4 OK |
| example 6 | resin material F | 170 | 2.4 | 3.2 | 75.0 OK |
| comparison example 1 | resin material G | 240 | 3.2 | 3.7 | 86.5 OK |
| comparison example 2 | resin material H | 140 | 0.008 | 1 | 0.8 NG |
| comparison example 3 | resin material I | −60 | 0.2 | 1.5 | 13.3 OK |
| comparison example 4 | resin material J | −70 | 0.06 | 4 | 1.5 NG |

In general, the resin material exceeding the glass transition temperature is softened, which incurs reduction in the pierce strength, and the material becomes unstable. The resin material suitable for anti-whisker purpose thus preferably has a glass transition temperature not lower than the maximum operating temperature of the electronic component that employs this resin material. As indicated in Table 4, resin material I used in comparison example 3 has a glass transition temperature remarkably lower than 150° C. When resin material I is used in a high-class aluminum electrolytic capacitor of which maximum operating temperature is 150° C., it cannot guarantee that abnormal whisker will not project, because the physical properties of the resin material are unstable.

On the other hand, lead wires 11 used in samples 1-6 employ resin materials A-F of which glass transition temperatures are not lower than 150° C., so that they can maintain stable physical properties, and it can be guaranteed that no abnormal whisker projects.

As shown in Table 4, lead wires 11 used in samples 1-6 employ resin materials A-F each of which Young's modulus at 150° C. falls within the range from 10% to 100% of the Young's modulus at −55° C. Thus, even if resin film 15 is subjected to a severe external condition where the temperature changes as much as from 150° C. to −55° C., resin film 15 will not peel off and yet maintain the adhesion.

In the case of employing aromatic polyamide-imide as the resin material for resin film 15, the physical properties and the film thickness are influenced by the molecular weight of the resin material contained in the resin solution. As indicated in Table 1, resin material G employed in comparison example 1 has a weight average molecular weight of 25,000, and this material cannot maintain the pierce strength or elastic coefficient necessary for anti-whisker purpose. On the other hand, resin materials A-E, used in samples 1-5 and having the weight average molecular weight of 30,000 or more, maintain the pierce strength and elastic coefficient necessary for anti-whisker purpose.

Table 1 shows a film thickness of each resin film 15 made of each one of the resin materials. Resin materials A-D employed in samples 1-4 allow obtaining a thickness of 10 µm, which is the minimum requirement for the anti-whisker purpose, or greater than 10 µm through only one time application of the resin solution. However, resin material E used in sample 5 cannot allow obtaining the thickness of 10 µm or more through only one time application of the resin solution, and twice or more than twice application processes are needed. In other words, under the condition of one time application of the resin solution, resin materials A-D used in samples 1-4 and having the weight average molecular weight not greater than 150,000 can maintain the thickness of 10 µm or greater. Resin material E used in sample 5 and having the weight average molecular weight of 200,000; however, cannot maintain the thickness of 10 µm or greater.

The foregoing discussion proves that the use of aromatic polyamide-imide, of which weight average molecular weight falls within the range from 30,000 to 150,000, inclusive, allows efficiently forming resin film 15 by only one time application process and maintaining the film thickness enough for the anti-whisker purpose.

Resin materials A and D employed in the aluminum electrolytic capacitors in accordance with samples 1 and 4 are differently synthesized from each other regarding aromatic polyamide-imide. Resin material A is synthesized by the isocyanate method, and resin material D is synthesized by the acid-chloride method. Material A is more excellent at solvent resistance than material D. In the assembly processes of the aluminum electrolytic capacitors, the electrolyte solution sometimes attaches to welded section 14 of lead wire 11. The aluminum electrolytic capacitor used in an on-vehicle electric device is sometimes attached with oil at its outer surface. Resin film 15 is thus brought into contact with the solvent as discussed above, and in such a case, resin material A can maintain more steadily the physical properties necessary for the anti-whisker purpose.

INDUSTRIAL APPLICABILITY

The electronic component of the present invention includes lead wires formed of a leader electrode and a metal wire. The leader electrode and the metal wire are welded together, thereby forming a welded section, which is coated with a resin film. This resin film has a pierce strength strong enough against growing acicular whisker. The resin film also has an elastic coefficient that does not allow generating cracks on the resin film when mechanical stress is applied to the resin film. The electronic component of the present invention thus can prevent steadily the outflow of the whisker to the outside. As a result, an electronic device employing this electronic component can be prevented from failures, e.g. short circuit or malfunction, caused by the whisker. The electronic component of the present invention is thus useful for AV devices or on-vehicle electric devices that require high reliability for an extended period of use.

The invention claimed is:

1. An electronic component comprising:
    a lead wire including a leader electrode made of metal containing aluminum, a metal wire containing tin, and a welded section formed by welding a first end of the metal wire to a first end of the leader electrode;
    a functional element connected to a second end of the leader electrode; and
    an outer housing that seals the functional element therein such that a second end of the metal wire is led out therefrom,
    wherein the lead wire further includes a resin film coating the welded section at least at a portion not covered with the outer housing, and a resin material for the resin film is chiefly made of one of polyester imide and aromatic polyamide-imide, and the resin material has a pierce strength of 0.16 MPa/μm per unit thickness or greater and an elastic coefficient of 4.5 GPa or less.

2. The electronic component of claim 1, wherein the resin material has adhesion to aluminum and tin respectively of 10N or greater after a pressure cooker test done under conditions of 121° C., a pressure of 2 atmospheres and 100% RH for 24 hours.

3. The electronic component of claim 1, wherein the resin material has a glass transition temperature of 150° C. or higher.

4. The electronic component of claim 1, wherein the resin material has Young's modulus at 150° C. that falls within a range from 10% to 100%, inclusive, of Young's modulus at −55° C.

5. The electronic component of claim 1, wherein the aromatic polyamide-imide is synthesized by isocyanate method.

6. The electronic component of claim 1, wherein the polyamide-imide has a weight average molecular weight that falls within a range from 30,000 to 150,000, inclusive.

7. A lead wire to be used for an electronic component, the lead wire comprising:
    a leader electrode made of metal containing aluminum;
    a metal wire containing tin;
    a welded section formed by welding a first end of the metal wire to a first end of the leader electrode; and
    a resin film coating the welded section at least at an edge portion on a side nearer the metal wire,
    wherein a resin material for the resin film is chiefly made of one of polyester imide and aromatic polyamide-imide, and the resin material has a pierce strength of 0.16 MPa/μm per unit thickness or greater and an elastic coefficient of 4.5 GPa or less.

8. The lead wire of claim 7, wherein the resin material has adhesion to aluminum and tin respectively of 10N or greater after a pressure cooker test done under conditions of 121° C., a pressure of 2 atmospheres and 100% RH for 24 hours.

9. The lead wire of claim 7, wherein the resin material has a glass transition temperature of 150° C. or higher.

10. The lead wire of claim 7, wherein the resin material has Young's modulus at 150° C. falls within a range from 10% to 100%, inclusive, of Young's modulus at −55° C.

11. The lead wire of claim 7, wherein the aromatic polyamide-imide is synthesized by an isocyanate method.

12. The lead wire of claim 7, wherein the polyamide-imide has a weight average molecular weight that falls within a range from 30,000 to 150,000, inclusive.

* * * * *